United States Patent [19]

Hargraves

[11] Patent Number: 5,067,216
[45] Date of Patent: Nov. 26, 1991

[54] ADJUSTABLE LINE BLOCK FOR AUTOBODIES

[76] Inventor: Kevin D. Hargraves, 1102 - 606 Victoria Avenue, Saskatoon, Saskatchewan, Canada, S7N 0Z1

[21] Appl. No.: 446,619

[22] Filed: Dec. 6, 1989

[51] Int. Cl.⁵ .............................................. B23D 71/08
[52] U.S. Cl. ............................................ 29/79; 29/78
[58] Field of Search ............... 29/78, 79; 30/172, 502, 30/505

[56] References Cited

U.S. PATENT DOCUMENTS

| | | | |
|---|---|---|---|
| 1,017,774 | 2/1912 | Leavitt | 29/79 |
| 2,445,324 | 7/1948 | Greenwell | 33/561.1 |
| 2,615,256 | 10/1952 | Olson | 33/561.1 |
| 2,721,391 | 10/1955 | Von Duyke | 33/561.1 |
| 2,881,486 | 4/1959 | Soref | 164/15 |
| 3,102,325 | 9/1963 | Hemmeter | 29/79 |
| 3,419,965 | 1/1969 | Madden | 33/561.1 |
| 3,951,012 | 4/1976 | Staley | 29/78 |
| 4,021,899 | 5/1977 | Jensen | 29/79 |
| 4,715,124 | 12/1987 | Harrington | 33/175 |

*Primary Examiner*—William E. Terrell
*Attorney, Agent, or Firm*—Murray E. Thrift; Stanley G. Ade; Adrian D. Battison

[57] ABSTRACT

A line block is used for producing profiles on bodies, especially filled automobile bodies. The block is composed of a series of thin, stacked plates with fine cutting teeth along one edge of each plate. The plates are clamped together with bolts so that they can be loosened and pressed against a profile to be matched so that the cutting edges of the plates follow the profile. The bolts are then tightened and the line block used to produce the desired profile. Notches in the cutting edges of the plates are offset on adjacent plates in the block to accommodate material removed from the body being profiled.

8 Claims, 2 Drawing Sheets

ADJUSTABLE LINE BLOCK FOR AUTOBODIES

FIELD OF THE INVENTION

The present invention relates to a line block and more particularly to an adjustable line block especially suited for finishing automobile bodies.

BACKGROUND

Automobile and truck bodies are often provided with recesses extending along the side panels. The profiles of these recesses vary from vehicle to vehicle. If the vehicle body becomes damaged in the vicinity of these recesses, the body is repaired by hammering out the body to close to the original configuration, filling the damaged area with body filler and then sanding the filler back to the original configuration.

The present invention is concerned with a novel adjustable line block for use in contouring the body filler to the original body configuration.

SUMMARY

According to one aspect of the present invention there is provided an adjustable line block comprising:

a plurality of stacked plates each having an elongate cutting edge;

cutting teeth formed in the cutting edge of each plate;

means for holding the plates together with their cutting edges parallel, while permitting relative movement of the plates transversely the cutting edge; and means for clamping the plates together to prevent relative movement thereof.

The block may be pressed against the vehicle body at a place where the original profile is present, to bring the cutting edges of the plates into line with the profile. The plates are then clamped in place and the block is ready for use.

Preferably, the cutting edges of the plates are notched at uniform intervals along the plates, with the notches of adjacent plates offset. This leaves space in the cutting face of the block, on either side of the teeth on each plate to receive the powdered filler material removed by the cutting action of the teeth. Clearing of the cutting face of the block is also assisted by apertures formed in each plate adjacent the cutting edge in between the notches. These will communicate with the notches of the adjacent plates, providing additional capacity for receiving and removing the powdered filler.

According to another aspect of the present invention there is provided a cutting plate for an adjustable line block comprising a flat plate having a cutting edge with cutting teeth thereon and notches uniformly spaced along the cutting edge, at a predetermined pitch length, a pair of parallel, elongate slots through the plate perpendicular to the cutting edge, the slots being offset with respect to the notches in a direction parallel to the cutting edge and by $\frac{1}{2}$ the pitch length of the notches.

With a plate of this configuration, all of the plates in the line block may be of the same configuration. In assembling the block, adjacent plates are reversed, end to end, so that the notches and teeth of adjacent plates are offset.

BRIEF DESCRIPTION OF THE DRAWINGS

In the accompanying drawings, which illustrate an exemplary embodiment of the present invention.

DETAILED DESCRIPTION

Figure 1:
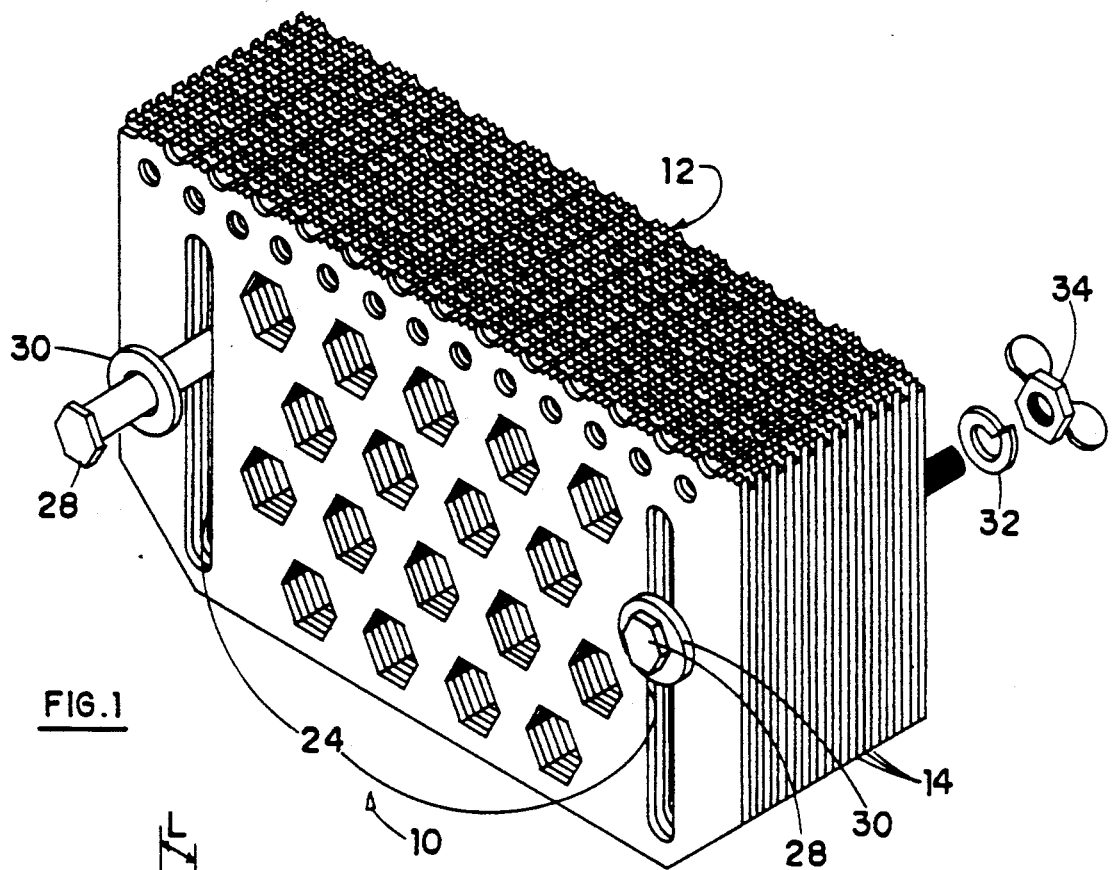
FIG. 1 is an isometric representation of a line block.
Figure 2:
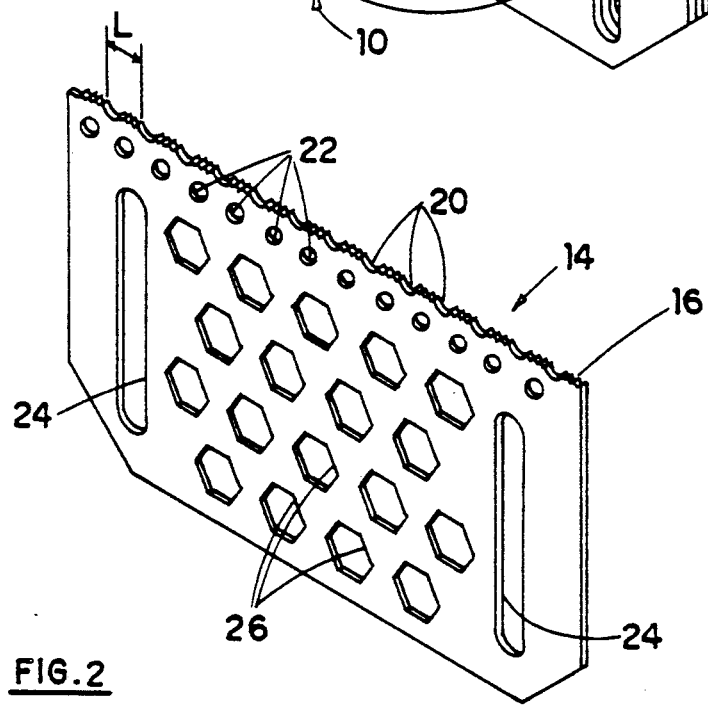
FIG. 2 is an isometric representation of a plate used in the line block of FIG. 1.

Referring to the accompanying drawings, especially to FIG. 1, there is illustrated a line block 10 with a cutting face 12. The block is composed of a series of stacked plates 14, such as the plate illustrated in FIG. 2. Each plate has a cutting edge 16 equipped with symmetrical cutting teeth capable of cutting in both directions, longitudinally of the cutting edge. Spaced uniformly along the cutting edge are notches 20 that interrupt the teeth. The notches are spaced uniformly along the cutting edge at a pitch length L. Each notch has a total length of $\frac{1}{2}$ L so that each set of teeth, between two notches, also has a length of $\frac{1}{2}$ L.

Adjacent the cutting edge, and between the notches 20 are circular apertures 22 that cooperate with the notches to assist in clearing the cutting face of the line block.

Figure 6:
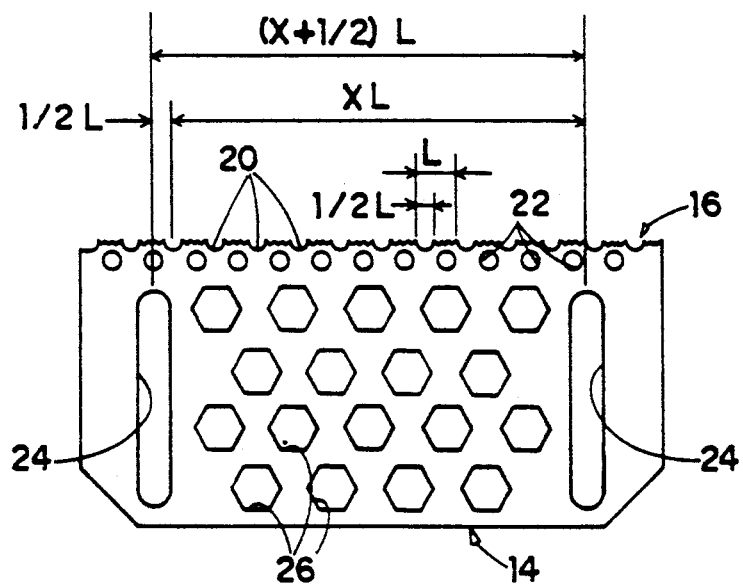
FIG. 6 is an elevation of a cutting plate.

Each plate has two elongate slots 24 that are perpendicular to the cutting edge. The slots 24 are offset longitudinally of the cutting edge with respect to the notches, by a distance of one notch length ($\frac{1}{2}$ L). As illustrated in FIG. 6, this means that the centre-to-centre distance between the slots 24 is $(X+\frac{1}{2})L$ where X is an integer. Consequently, the adjacent plates may be reversed end to end With respect to one another and arranged with the slots 24 in alignment, leaving the teeth and notches of each plate offset in the direction of the cutting edge with respect to the teeth and notches of the adjacent plate or plates.

The main body of each plate is perforated with a number of openings 26 that assist in reducing the overall weight of the line block.

In the assembled line block, the cutting edges of the plates are maintained parallel to one another by elongate bolts 28 extending through the aligned slots 24. Washers 30 engage under the heads of the bolts. The plates of the line block are clamped together using lock washers 32 and wing nuts 34.

Figure 3:
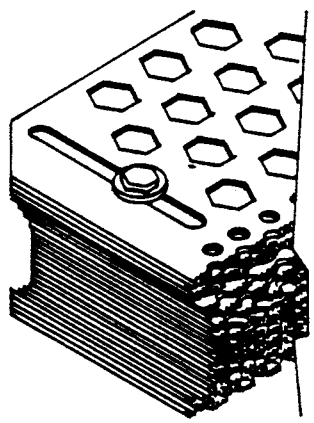
FIGS. 3, 4 and 5 illustrate the use of the line block for sanding various profiles.
Figure 4:
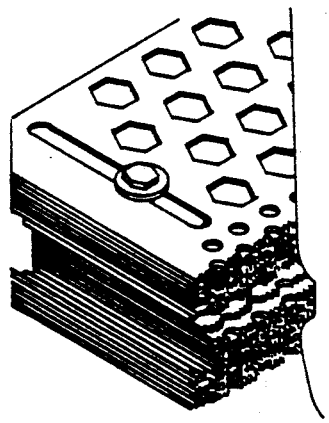
Figure 5:
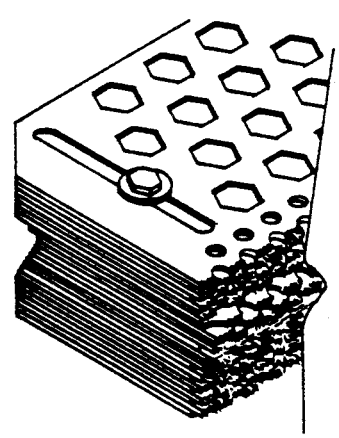

In use of the line block, the wing nuts 34 are loosened slightly and the block is placed against the body to be sanded at a location where it is undamaged. The plates are then pushed in against the body so that their cutting edges follow the contour of the body as shown in FIGS. 3, 4 and 5. The wing nuts 34 are then tightened to clamp the plates in position. The block is then rubbed gently longitudinally in the filled part of the body to smooth off the filler in a configuration that is a continuation of the undamaged profile.

In the drawings, the profile illustrated in FIG. 3 is a typical profile found in the bodies of Chrysler Corporation trucks and vans. In FIG. 4, the illustrated profile is typical of a Dodge van, while in FIG. 5, the illustrated profile is typical of Ford trucks.

As filler removal proceeds, the removed filler is received by the notches 20 on either side of the teeth and discharges from the line block through the notches and apertures 22. The plates are preferably made very thin, with up to eighty plates in a single line block. The teeth are fine and are cut symmetrically so as to cut in both directions of movement. With sufficiently thin plates and fine teeth, it is possible to finish the body with the block to a condition substantially ready for painting.

While one embodiment of the present invention has been described in the foregoing, it is to be understood that other embodiments are possible within the scope of the invention. The invention is to be considered limited solely by the scope of the appended claims.

I claim:

1. An adjustable line block for finishing a profiled surface of a workpiece, said line block comprising:
   a plurality of stacked plates each having an elongate cutting edge;
   a plurality of notches uniformly spaced along the cutting edge of each plate;
   a plurality of symmetrical cutting teeth formed in the cutting edge of each plate between each two adjacent notches, the teeth of each plate being aligned along the cutting edge for simultaneous engagement of the teeth with the profiled surface;
   means for holding the plates together with their cutting edges parallel and with adjacent notches in the cutting edges of adjacent plates offset from one another in the direction of the cutting edges, while permitting relative movement of the plates transversely of the cutting edge; and
   means for clamping the plates together to prevent relative movement thereof.

2. A line block according to claim 1 including circular apertures in each plate, adjacent the cutting edge, between the notches.

3. A line block according to claim 1 wherein the means for holding the plates together comprise a plurality of elongate slots in each plate, perpendicular to the cutting edge, the slots of the plates being aligned, and a plurality of elongate members extending through the aligned slots.

4. A line block according to claim 3 wherein each elongate member comprises a bolt and the means for clamping the plates together comprise nuts threaded onto the respective bolts.

5. A cutting plate for an adjustable line block comprising a flat plate having an elongate cutting edge with notches uniformly spaced along the cutting edge, at a predetermined pitch length and respective pluralities of cutting teeth on the cutting edge between each two adjacent notches, the pluralities of teeth being aligned along the cutting edge, a pair of parallel, elongate slots through the plate perpendicular to the cutting edge, the slots having a centre-to-centre spacing in a direction parallel to the cutting edge of $(X+\frac{1}{2})L$ where X is an integer and L is the pitch length of the notches.

6. A cutting plate according to claim 5 wherein each notch has a length substantially equal to $\frac{1}{2}$ the pitch length.

7. A cutting plate according to claim 6 including apertures in the plate, adjacent the cutting edge and between the notches.

8. A cutting plate according to claim 7 wherein the teeth are symmetrically arranged for cutting in both directions parallel to the cutting edge.

* * * * *